United States Patent [19]

Schwarz et al.

[11] Patent Number: 5,122,187

[45] Date of Patent: Jun. 16, 1992

[54] HOT MELT INK COMPOSITIONS

[75] Inventors: William M. Schwarz, Webster, N.Y.; Robert H. Marchessault, Montreal; Lupu Alexandru, Toronto, both of Canada; Bernard Henrissat, Grenoble, France

[73] Assignee: Xerox Corporation, Stamford, Conn.

[21] Appl. No.: 641,844

[22] Filed: Jan. 17, 1991

Related U.S. Application Data

[62] Division of Ser. No. 369,797, Jun. 22, 1989, Pat. No. 5,006,170.

[51] Int. Cl.⁵ .................. C09D 11/14; C09D 11/02
[52] U.S. Cl. ........................ 106/25; 106/20; 106/22
[58] Field of Search .............. 106/20, 22, 25, 32

[56] References Cited

U.S. PATENT DOCUMENTS

| | | | |
|---|---|---|---|
| 3,776,742 | 12/1973 | Sanders | 106/22 |
| 4,156,776 | 5/1979 | Mufti et al. | 106/25 |
| 4,186,024 | 1/1980 | Fujimoto et al. | 106/20 |
| 4,202,566 | 5/1980 | Kosche | 106/21 |
| 4,617,371 | 10/1986 | Blumstein et al. | 252/299.01 |
| 4,838,938 | 6/1989 | Tomida et al. | 106/25 |

*Primary Examiner*—William R. Dixon, Jr.
*Assistant Examiner*—Helene Klemanski
*Attorney, Agent, or Firm*—Judith L. Byorick

[57] ABSTRACT

Disclosed are hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

14 Claims, No Drawings

HOT MELT INK COMPOSITIONS

This is a division, of application Ser. No. 369,797, filed Jun. 22, 1989, now U.S. Pat. No. 5,006,170.

BACKGROUND OF THE INVENTION

The present invention is directed to hot melt ink compositions. More specifically, the present invention is directed to ink compositions that are solid at room temperature and that are suitable for ink jet printing processes, particularly thermal ink jet printing processes.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, they are much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The second type of drop-on-demand system is known as thermal ink jet, or bubble jet, and produces high velocity droplets and allows very close spacing of nozzles. The major components of this type of drop-on-demand system are an ink-filled channel having a nozzle on one end and a heat generating resistor near the nozzle. Printing signals representing digital information originate an electric current pulse in a resistive layer within each ink passageway near the orifice or nozzle causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described, for example, in U.S. Pat. Nos. 4,601,777; 4,251,824; 4,410,899; 4,412,224; and 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of the solid ink in a thermal ink jet printer. In thermal ink jet printing processes employing hot melt inks, the solid ink is melted by the heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Some of the hot melt inks of the present invention contain liquid crystalline materials. Inks containing crystalline or liquid crystalline materials are known. For example, U.S. Pat. No. 3,776,742 discloses an electrically conductive aqueous base ink for use in printing on a cellulose containing base member by formation of discrete droplets. The ink comprises a water soluble dye, a water soluble inorganic conductive material in an amount of 1 to 20 percent, a water soluble polyol in an amount of from 5 to 50 percent, an organic crystallizable material in an amount of from 5 to 20 percent, which organic material acts temporarily as a plasticizer for cellulose, and water. Typical crystallizable materials include sugars such as glucose, sucrose, fructose, and the like, including glucono D-lactone. In addition, U.S. Pat. No. 4,617,371 discloses polymeric liquid crystals which retain their mesomorphic structure and properties associated therewith at temperatures below their glass transition temperature. The polymers contain mesogen and spacer units in alternating sequence in the main chain and may carry aliphatic substituents. The spacer moieties may be compounds having a flexible hydrocarbon chain with terminal functional groups at both ends of the chain that react, under appropriate reaction conditions, to form linkages with the mesogenic monomers.

The present invention is directed to hot melt ink compositions suitable for ink jet printing, particularly thermal ink jet printing. A need exists for hot melt inks that result in images needing no further fixing or fusing treatment, such as drying or heating. There is also a need for hot melt inks that generate prints of excellent color quality, print density, and fix, and with minimal paper cockle or distortion. In addition, there is a need for hot melt inks that generate high quality images on transparency materials. Further, a need exists for hot melt inks with excellent waterfastness and lightfastness. There is also a need for hot melt inks with rapid drying times. Additionally, there is a need for hot melt inks containing liquid crystalline materials with sharp melting points and low viscosities at temperatures of from about 60° to about 150° C. Further, there is a need for hot melt inks containing liquid crystalline materials that exhibit high shear-thinning behavior.

SUMMARY OF THE INVENTION

It is an object of the present invention to provide hot melt inks that result in images needing no further fixing or fusing treatment.

It is another object of the present invention to provide hot melt inks that generate prints of excellent color quality, print density, and fix, and with minimal paper cockle or distortion.

It is yet another object of the present invention to provide hot melt inks that generate high quality images on transparency materials.

It is still another object of the present invention to provide hot melt inks with excellent waterfastness and lightfastness.

Another object of the present invention is to provide hot melt inks with rapid drying times.

Yet another object of the present invention is to provide hot melt inks containing liquid crystalline materials with sharp melting points and low viscosities at temperatures of from about 60° to about 150° C.

Still another object of the present invention is to provide hot melt inks containing liquid crystalline materials that exhibit high shear-thinning behavior.

These and other objects of the present invention are achieved by providing a hot melt ink composition comprising a binder, a propellant, and a colorant. The binder is optional, since the other ink components can also function as a binder. The binder is present in an effective amount, generally from 0 to about 85 percent by weight and preferably from about 50 to about 70 percent by weight. The propellant is present in an effective amount, generally from about 10 to about 90 percent by weight and preferably from about 30 to about 50 percent by weight. The colorant is present in an effective amount, generally from about 0.5 to about 10 percent by weight of the binder/propellant mixture and preferably from about 3 to about 5 percent by weight of the binder/propellant mixture. Optionally, the hot melt ink composition may comprise a biocide in an effective amount, generally from about 0.1 to about 1.0 percent by weight, although a biocide is not as neccesary an ingredient for hot melt inks as it is for liquid inks. Suitable biocides include sorbic acid, 1-(3-chloroallyl)-3,5,7-triaza-1-azoniaadamantane chloride, commercially available as Dowicil 200 (Dow Chemical Company, Midland, MI), vinylenebis thiocyanate, commercially available as Cytox 3711 (American Cyanamid Company, Wayne, NJ), disodium ethylenebis-dithiocarbamate, commercially available as Dithone D14 (Rohm & Haas Company, Philadelphia, PA), bis (trichloromethyl) sulfone, commercially available as Biocide N-1386 (Stauffer Chemical Company, Westport, CT), zinc pyridinethione, commerically available as zinc omadine (Olin Corporation Stamford, CT), 2-bromo-t-nitropropane-1,3-diol, commerically available as onyxide 500 (Onyx Chemical Company, Jersey City, NJ), Bosquat MB50 (Louza, Inc., Fairtown, NJ), and the like. In addition, other optional additives such as dispersing agents or surfactants may be present in the ink in amounts of from about 0.01 to about 20 percent by weight. Further, plasticizers such as pentaerythritol tetrabenzoate, commerically available as Benzoflex S552 (Velsicol Chemical Corporation, Chicago, IL), trimethyl citrate, commerically available as Citroflex 1 (Monflex Chemical Company, Greensboro, NC), N,N-dimethyl oleamide, commerically available as Halcomid M-18-OL (C. P. Hall Company, Chicago, IL), and the like, may be added to the binder, and may constitute from about 1 to 100 percent of the binder component of the ink. Plasticizers can either function as the binder or can act as an agent to provide compatibility between the ink propellant, which generally is polar, and the ink binder, which generally is non-polar.

Suitable colorants, present in an effective amount generally of from about 0.5 to about 10 percent by weight, include pigments and dyes, with solvent dyes being preferred. Any dye or pigment may be chosen, provided that it is capable of being dispersed or dissolved in the binder and is compatible with the other ink components. Examples of suitable pigments include Violet Toner VT-8015 (Paul Uhlich), Normandy Magenta RD-2400 (Paul Uhlich), Paligen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Tolidine Red (Aldrich), Scarlet for Thermoplast NSD PS PA (Ugine Kuhlmann of Canada), E. D. Toluidine Red (Alrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (red orange) (Matheson, Coleman, Bell), Sudan II (orange) (Matheson, Coleman, Bell), Sudan IV (orange) (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Gelb L1250 (BASF), Suco-Yellow D1355 (BASF), Sico Fast Yellow D1355, D1351 (BASF), Hostaperm Pink E (American Hoechst), Fanal Pink D4830 (BASF), Cinquasia Magenta (DuPont), Paliogen Black L0084 (BASF), Pigment Black K801 (BASF), and carbon blacks such as Regal 330 ® (Cabot). Carbon Black 5250 and Carbon Black 5750 (Columbian Chemicals Company). Suitable dyes for the inks of the present invention include Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc., and the like. Particularly preferred are solvent dyes, and within the class of solvent dyes, spirit soluble dyes are preferred because of their high compatibility with binder materials. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

Typical binders for the hot melt inks of the present invention generally have melting points of from about 60° to about 150° C., and preferably from about 80° to about 120° C., as determined by observation and measurement on a microscope hot stage, wherein the binder material is heated on a glass slide and observed by microscope. Higher melting points are acceptable, although printhead life may be reduced at these temperatures. In addition, the surface tension of the binder at the operating temperature of the ink should be from about 20 to about 65 dynes per centimeter, and preferably from about 40 to about 65 dynes per centimeter to enhance refill rates, paper wetting, and color mixing. Operating temperatures of the inks of the present invention are generally from about 60° to about 150° C. Higher temperatures are acceptable, although they may reduce the lifetime of the heater and printhead. Generally, the operating temperature is selected to obtain low ink viscosity while avoiding extensive fuming or smoking. The viscosity of the binder at the operating temperature of the ink is generally from about 1 to about 10 centipoise, and preferably from about 1 to about 5 centipoise to enhance refilling of the jets, jettability, and substrate penetration. The binder should also be thermally stable in its molten state so that it does not undergo decomposition to yield gaseous products or to form heater deposits. Additionally, the binder should enable printed images with sufficient flexibility to prevent cracking or creasing.

Examples of suitable binders for the hot melt inks of the present invention, present in an effective amount, generally from 0 to about 85 percent by weight of the ink and preferably from about 30 to about 70 percent by weight of the ink, include rosin esters; polyamides; dimer acid amides; fatty acid amides, including Aramid C, available from Azko Chemie, Chicago, IL; epoxy resins, such as Epotuf 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including Ketjenflex MH and Ketjenflex MS80, available from Azko Chemie, Chicago, IL; benzoate esters, such as Benzoflex S552, available from Velsicol Chemical Company, Chicago, IL; long chain alcohols, including Unilin 425, available from Petrolite Corporation, Tulsa, OK; ethoxylated long chain alcohols, including Unithox 720 (molecular weight about 720, 4 ethoxy groups), Unithox 550 (molecular weight about 550, 13 ethoxy groups), and Unithox 520 (molecular weight about 520, 3 ethoxy groups), all available from Petrolite Corporation, Tulsa, OK; phthalate plasticizers; citrate plasticizers; maleate plasticizers; sulfones, such as diphenyl sulfone, n-decyl sulfone, n-amyl sulfone, chlorophenyl methyl sulfone; polyvinyl pyrrolidinone copolymers; polyvinyl pyrrolidone/polyvinyl acetate copolymers; novalac resins, such as Durez 12 686, available from Occidental Chemical Company, Buffalo, NY; and natural product waxes, such as beeswax, monton wax, candelilla wax, Gilsonite (American Gilsonite Company), and the like. Particularly preferred as binders are long chain alcohols, such as linear primary alcohols with from about 16 to about 70 carbon atoms. Examples of these alcohols include Unilin 425, a linear primary alcohol with about 26 carbon atoms, available from Petrolite Corporation, Tulsa, OK. Unilin 700, a linear primary alcohol with about 50 carbon atoms and a molecular weight of about 700, and Unilin 550, a linear primary alcohol with about 39 carbon atoms and a molecular weight of about 550. Other preferred binders include mixtures of linear primary alcohols with linear long chain amides or fatty acid amides, such as those with from about 6 to about 24 carbon atoms, including Paricin 9 (propylene glycol monohydroxystearate), Paricin 13 (glycerol monohydroxystearate), Paricin 15 (ethylene glycol monohydroxystearate), Paricin 220 (N(2-hydroxyethyl)-12-hydroxystearamide), Paricin 285 (N,N'-ethylene-bis-12-hydroxystearamide), Flexricin 185 (N,N'-ethylene-bis-ricinoleamide), and the like, all available from CasChem Company, Bayonne, NJ, in an amount of from about 20 to about 70 percent by weight of the binder; Kemamide B (behenamide/arachidamide), Kemamide W40 (N,N'-ethylenebisstearamide), Kemamide P181 (oleyl palmitamide), Kemamide S (stearamide), Kemamide U (oleamide), Kemamide E (erucamide), Kemamide O (oleamide), Kemamide W45 (N,N'-thylenebisstearamide), Kenamide W20 (N,N'-ethylenebisoleamide), Kemamide E180 (stearyl erucamide), Kemamide E221 (erucyl erucamide), Kemamide S180 (stearyl stearamide), Kemamide S221 (erucyl stearamide), and the like, all available from Humko Chemical Company, Memphis, TN, in an amount of from about 10 to about 40 percent by weight of the binder. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are preferred binder materials, with n-decyl sulfone being particularly preferred. The binders may comprise one or more of the aforementioned suitable materials.

Another class of materials suitable as binders for hot melt inks are liquid crystalline in nature. Hot melt inks with liquid crystalline binders according to the present invention exhibit sharp melting points, which enables rapid melting of the ink and rapid solidifying of the ink on the printing substrate, thereby enabling rapid printing speeds. In addition, hot melt inks with liquid crystalline binders according to the present invention exhibit high shear thinning behavior, which means that under shear or stress, the melt viscosity is lowered. The inks are subjected to shear or stress as they pass through the jetting nozzle of the printer, and the ink viscosity is lowered during the printing process, which enables increased printing speed and also results in enhanced print quality, since the lowered viscosity of the ink enables a high degree of interaction between the ink and the printing substrate. Examples of suitable liquid crystalline materials for the inks of the present invention include alkyl thio$\beta$-D-glucosides, of the general formula:

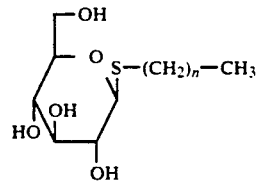

wherein n is a number between about 7 and about 100, preferably from about 7 to about 30. Materials of this type can be prepared by the methods described by K. Hamacher, *Carbohydrate Research*, vol. 128, pages 291 to 295 (1984), and by D. Horton, *Methods in Carbohydrate Chemistry*, vol. 2, pages 368 to 373 and 433 to 437 (1963), the disclosure of which is totally incorporated herein by reference, by the following reactions.

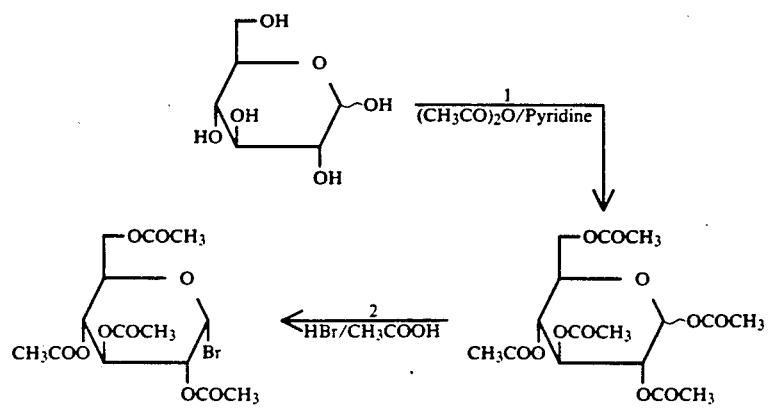

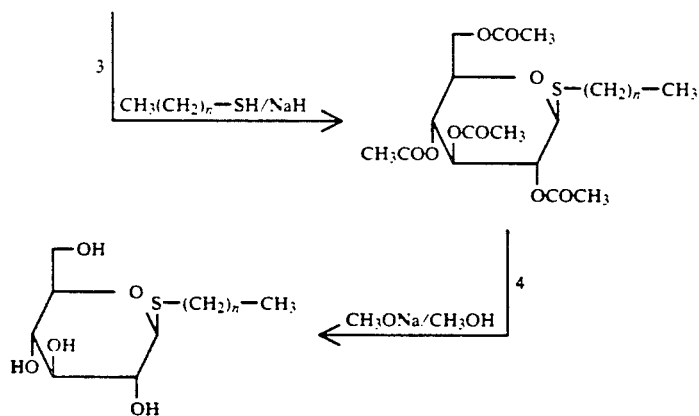

Generally, the synthesis entails activation of the anomeric carbon of D-glucose by a peracetylation step with acetic anhydride in the presence of pyridine, followed by a hydrogen bromide treatment in the presence of acetic acid. The resulting acetobromoglucose is then reacted with a n-alkyl thiolate having at least 7 carbon atoms. Subsequently, the acetyl groups on the glucose ring are removed by a sodium methoxide solution in methanol to yield a n-alkyl thio-$\beta$-D-glucoside having liquid crystalline properties. In one example, 30 grams of D-glucose is treated with 50 milliliters of acetic anhydride in the presence of 60 milliliters of pyridine, followed by hydrogen bromide treatment in the presence of acetic acid, and the resulting acetobromoglucose is then reacted with an equimolar amount of a n-alkyl thiolate, followed by treatment with a sodium methoxide solution in methanol.

Alternatively, another reaction scheme, shown below, may be used to prepare the alkyl-1-thio-$\beta$-D-glucoside.

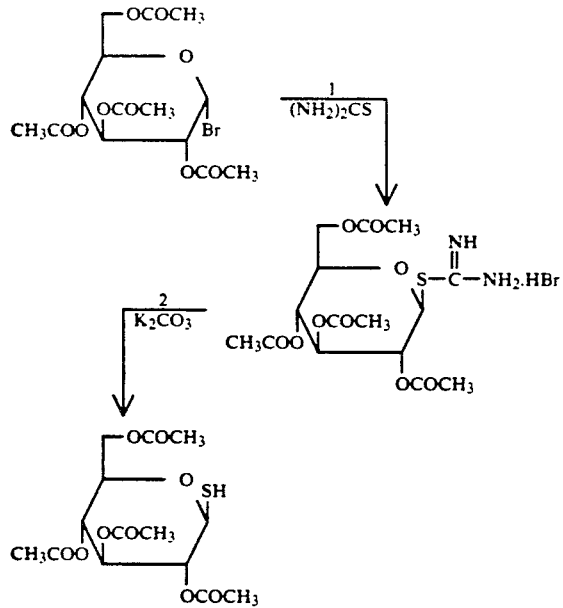

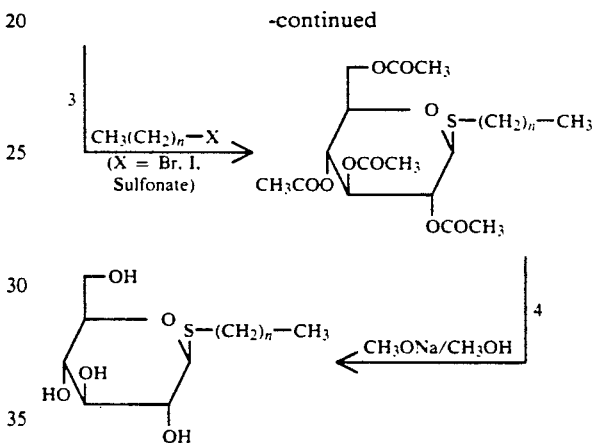

Acetobromoglucose is treated with thiourea in acetone, and the resulting 2-tetra-O-acetyl-$\beta$-D-glucosyl)-2-thiopseudourea hydrobromide is then converted to tetra-O-acetyl-1-thio-$\beta$-D-glucose in the presence of potassium carbonate. Alkylation of this glucose derivative with an alkyl halide and subsequent de-O-acetylation with sodium methoxide in methanol yield alkyl-1-thio-$\beta$-D-glucoside. In one example, 200 grams of acetobromoglucose is treated with 40 grams of thiourea in 200 milliliters of acetone, followed by treatment of the resulting 2-tetra-O-acetyl-$\beta$-D-glucosyl)-2-thiopseudourea hydrobromide with 70 grams of potassium carbonate to form tetra-O-acetyl-1-thio-$\beta$-D-glucose, and subsequent alkylation with 75 milliliters of an alkyl halide and treatment with sodium methoxide in methanol.

Also suitable as liquid crystalline components of the hot melt inks of the present invention are n-alkyl-$\beta$-D-glycosides of the general formula:

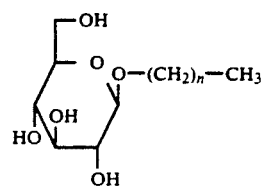

wherein n is a number between about 7 and about 100, preferably from about 7 to about 30. Alkylation of the glucose derivative of the formula

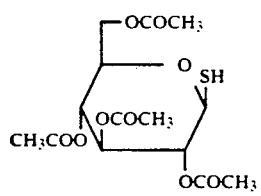

with methyl iodide results in methyl tetra-O-acetyl-1-thio-β-D-glucoside, which may be used as an intermediate for obtaining a series of n-alkyl-O-glycosides by the procedure set forth by H. Lönn, *Carbohydrate Research*, vol. 139, pages 105 to 113 (1985), the disclosure of which is totally incorporated herein by reference. A process for preparing n-alkyl-β-D-glycosides, which are another class of suitable binders for hot melt thermal ink jet inks, is as follows.

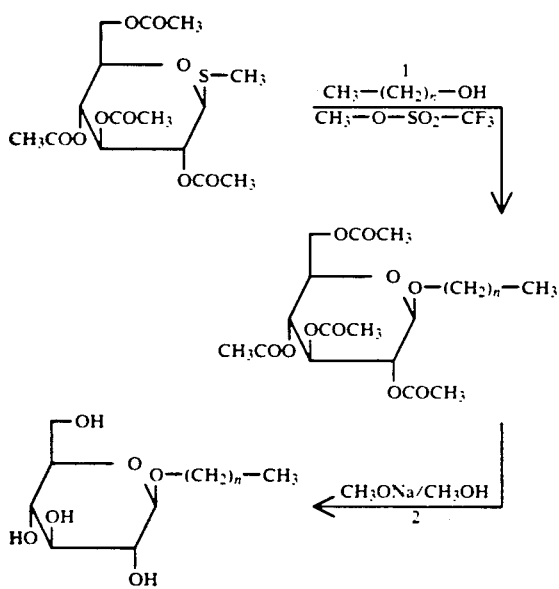

The n-alkyl-O-glycosides exhibit thermotropic properties if the n-alkyl chain has at least 7 carbon atoms. The process entails reaction of methyl tetra-O-acetyl-1-thio-β-D-glucoside with a n-alcohol in the presence of methyl trifluoromethanesulfonate, and subsequent de-O-acetylation yields n-alkyl-β-D-glucosides. n-Alkyl-β-D-glucosides may also be prepared by a Koenigs-Knorr reaction or by variations thereof, as follows:

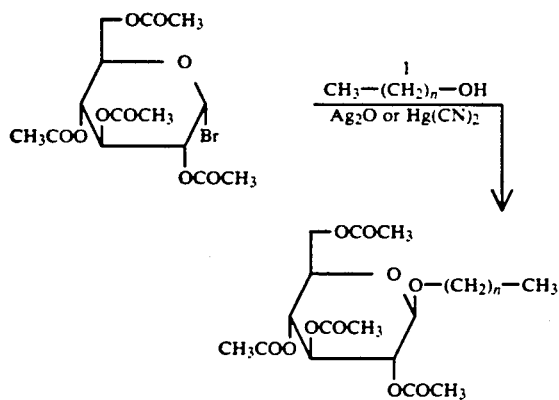

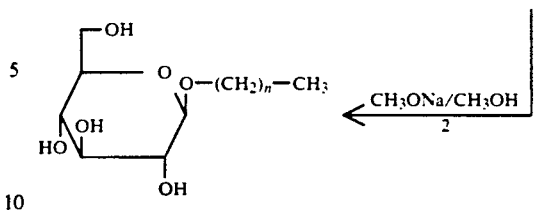

-continued

As shown, a n-alcohol is reacted with a glycosyl bromide such as acetobromoglucose in the presence of silver oxide, as taught by E. A. Tally, *Methods in Carbohydrate Chemistry*, vol. 2, pages 337 to 340 (1963), the disclosure of which is totally incorporated herein by reference, or in the presence of mercury (II) cyanide, as taught by K. Takeo, K. Okushio, K. Fukuyama, and T. Kuge, *Carbohydrate Research*, vol. 121, page 163 (1983), the disclosure of which is totally incorporated herein by reference, and the resulting derivative is then de-O-acetylated to the n-alkyl-β-D-glucoside.

The above four reation sequences may also be applied to other reducing carbohydrates or carbohydrate oligomers, such as galactose, xylose, mannose, arabinose, fructose, cellobiose, maltose, lactose, and the like.

n-Alkyl 1-O-glycosides or 1-S-glycosides incorporating modifications on the sugar component are also expected to be liquid crystalline. As employed herein, the term "n-alkyl" refers to an n-alkyl chain with from about 7 to about 100, and preferably from about 7 to about 30, carbon atoms. Examples of such modifications include deoxygenation, esterification, alkylation of one or several hydroxyl groups, oxydation of one or several hydroxyl groups to ketones, aldehyde, or acid functions, and the like.

Glycolipids with a n-alkyl chain linked to a carbohydrate or carbohydrate derivative molecule by linkages other than of the 1-O- and 1-S-glycosidic type are also liquid crystalline. In this instance, non-reducing carbohydrate derivatives such as glycosides, alkitols, aldonic acids and their lactones, inositols, and non-reducing carbohydrate oligomers such as saccharose and trehalose can be employed as starting carbohydrates or carbohydrate derivatives. Suitable liquid crystalline binders include 1-O-alkyl derivatives of anhydroalditols, which can be prepared as reported in P. Köll and M. Oelting, *Angewande Chemie International Edition in English*, Vol. 25, pages 368 to 369 (1986), the disclosure of which is totally incorporated herein by reference. For example, 1,3:2,5-dianhydroglucitol reacts with n-alcohols in the presence of trifluoromethanesulfonic acid to yield 1-O-alkyl-2,5-anhydroglucitols as shown below.

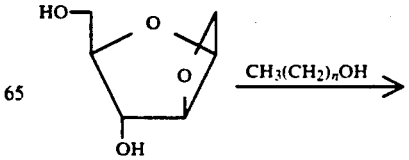

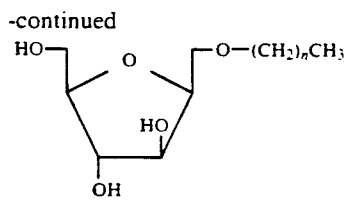

Another class of liquid crystalline binders includes liquid crystalline n-alkylamide derivatives of aldonic acids which can be prepared as described in B, Pfannemüller and W. Welte, *Chemistry and Physics of Lipids*, vol. 37, pages 227 to 240 (1985), the disclosure of which is totally incorporated herein by reference, as shown below.

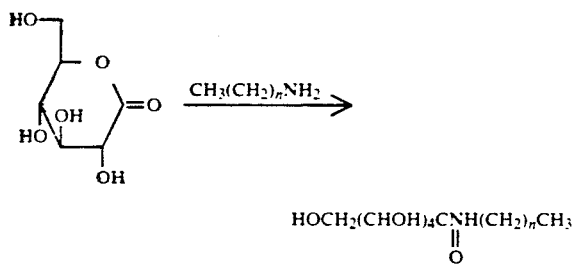

For example, the reaction of D-gluconic acid-δ-lactone with n-alkylamines yields 1-N-alkyl gluconamides. Another class of liquid crystalline binders includes 1-N-alkyl derivatives of sugar alditols which can be obtained by processes such as reductive amination of carbonyl containing carbohydrates and carbohydrate oligomers such as glucose, galacctose, mannose, xylose, arabinose, fructose, cellobiose, maltose, and lactose with n-alkylamines in the presence of sodium cyanoborohydride under the reaction conditions described in M. Yalpani and L. Hall, *Macromolecules*, vol. 17, pages 272 to 281 (1984), the disclosure of which is totally incorporated herein by reference, as shown below.

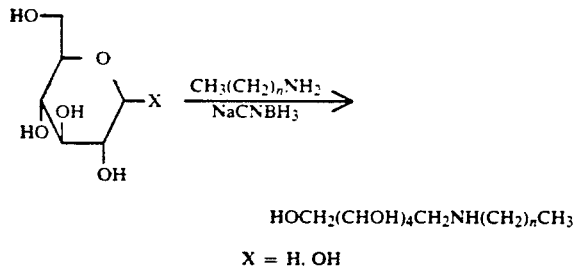

X = H, OH n-Alkyl-β-D-glucopyranosides and n-Alkyl-β-D-maltosides wherein the n-alkyl portion has from about 7 to about 100 carbon atoms, and preferably from about 7 to about 30 carbon atoms, are also suitable as binders for the solid hot melt inks of the present invention. Some of these materials are commercially available, including n-heptyl-β-D-glucopyranoside, n-octyl-β-D-glucopyranoside, n-nonyl-β-D-glucopyranoside, n-decyl-β-D-glucopyranoside, n-dodecyl-β-D-glucopyranoside, n-octyl-α-D-glucopyranoside, n-dodecyl-β-D-maltoside, and the like, available from Sigma, St. Louis, MO.

Particularly preferred liquid crystalline binders include n-dodecyl-1-thio-β-D-glucopyranoside, n-dodecyl-1-thio-β-D-galactopyranoside, and n-dodecyl-1-thio-β-D-xylopyranoside, which exhibit excellent shear-thinning behavior in the liquid crystalline state, as determined by dynamic sinusoidal oscillation cone and plate rheometry on a Rheometrics RMS7200 mechanical spectrometer.

Suitable propellants for the hot melt inks of the present invention, present in an effective amount generally of from about 10 to about 90 percent by weight and preferably from about 20 to about 50 percent by weight, generally have melting points of from about 50° to about 150° C., and preferably from about 80° to about 120° C. Although greater melting points are acceptable, they are generally not preferred because they may reduce printhead lifetime. In addition, the propellants generally have a boiling point of from about 180° to about 250° C., preferably from about 200° to about 230° C. Preferably, the melting point and the boiling point of the propellant are separated by at least 100° C. Further, the surface tension of the propellant in its liquid state at the operating temperature of the ink generally should be from about 20 to about 65 dynes per centimeter, and preferably from about 40 to about 65 dynes per centimeter to enhance refill rates, paper wetting, and color mixing. In addition, the propellants should have a viscosity at the operating temperature of the ink of from about 1 to about 10 centipoise, and preferably from about 1 to about 5 centipoise to enhance refill, jettability, and substrate penetration. The critical pressure of the propellant should be from about 40 to about 218 atmospheres, and preferably from about 60 to about 218 atmospheres to enhance drop velocity. The propellant should also be thermally stable in its molten state so that it does not undergo decomposition to yield gaseous products or to form heater deposits.

Examples of suitable propellants for the hot melt inks of the present invention include water; hydrazine; alcohols, such as ethanol, propanol, butanol, 2,5-dimethyl-2,5-hexanediol, 3-hydroxy benzyl alcohol, and the like; cyclic amines and ureas, including 1,3-dimethyl urea, such as imidazole, substituted imidazoles, including 2-imidazòlidone, 2-ethyl imidazole, 1,2,4-triazole, and the like, pyrazole and substituted pyrazoles, including 3,5-dimethyl pyrazole and the like; pyrazine; carboxylic acids; sulfonic acids; aldehydes and ketones; hydrocarbons, such as biphenyl, hexane, benzene; esters; phenols, including phenol, dichlorophenol, other halogen substituted phenols, and cresols; amides, such as propionamide, lactamide, and the like; imides; halocarbons; urethanes; ethers; sulfones, including dimethyl sulfone, methyl sulfone, diethyl sulfone, and diphenyl sulfone; sulfamides, such as methyl sulfamide; sulfonamides, such as ortho, para-toluenesulfonamide, methyl sulfonamide, and the like; phosphites; phosphonates; phosphates; alkyl sulfides, such as methyl sulfide; alkyl acetates, such as methyl acetate; sulfur dioxide; alkylene carbonates, such as propylene carbonate; succinimide; and the like. Preferred propellants include water, imidazole, imidazoles substituted with hydrocarbon, keto, or hydroxyl substituents, pyrazine, pyrazole, and pyrazoles substituted with hydrocarbon, keto, or hydroxyl substituents. These compounds are five-membered heterocyclic rings, preferably with a molecular weight of about 60. Also preferred are sulfones, such as dimethyl sulfone, diethyl sulfone, diphenyl sulfone, and the like. In addition, methyl sulfamide, succinimide, and propionamide are preferred propellants.

Hot melt ink compositions of the present invention are generally prepared by combining all of the ingredients, heating the mixture to its melting point, which generally is from about 80° to about 120° C., and stirring the mixture for from about 5 seconds to about 10 minutes to obtain a homogeneous, uniform melt. When pigments are the selected colorants, the molten mixture may be subjected to grinding in an attritor or ball mill apparatus to effect dispersion of the pigment in the binder.

Printed images may be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers, such as the ThinkJet ®, PaintJet ®, and DeskJet ® printers available from Hewlett-Packard Company. Conventional thermal ink jet printers may be modified to make them suitable for use with hot melt inks by including a means for heating the ink reservoir to the melting point of the ink. The inks of the present invention are also suitable for use in piezoelectric drop-on-demand ink jet printing systems and in continuous stream ink jet printing systems that have been modified to be suitable for use with hot melt inks.

Specific embodiments of the invention will now be described in detail. These examples are intended to be illustrative, and the invention is not limited to the materials, conditions, or process parameters set forth in these embodiments. All parts and percentages are by weight unless otherwise indicated. In some instances, transparent ink formulations were prepared so that bubble formation and jetting performance could be evaluated by observation under microscope, since bubble nucleation is difficult to observe in colored inks. It is believed that the transparent inks will exhibit similar performance when a dye is added to the ink composition.

EXAMPLE I

A black hot melt ink composition was prepared by mixing 14 parts by weight of pentaerythritol benzoate, commercially available as Benzoflex S552 from Velsicol Corporation, Chicago, IL, 84 parts by weight of methyl sulfone, and 2 parts by weight of Orasol Black RLP dye. The mixture was heated to 130° C., stirred until a homogeneous melt mixture was obtained, and subsequently was cooled to room temperature to yield a homogeneous, uniform black solid hot melt ink comprising about 14 percent by weight pentaerythritol benzoate, 84 percent by weight methyl sulfone, and 2 percent by weight of the dye.

A sample of the black hot melt ink was hand coated onto Xerox ® 4024 paper while it was in its molten state. The ink exhibited good compatibility with the paper in that no flaking or chipping was observed, the ink exhibited excellent crease resistance as determined by creasing the paper and smear resistance as determined by hand rubbing, and the ink remained on the paper after being soaked in hot water for 30 minutes.

EXAMPLE II

A transparent hot melt ink composition was prepared by mixing 50 parts by weight of phenyl sulfone and 50 parts by weight of methyl sulfone. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 50 percent by weight phenyl sulfone and about 50 percent by weight methyl sulfone.

A sample of the transparent hot melt ink was hand coated onto Xerox ® 4024 paper while it was in its molten state. The ink exhibited good compatibility with the paper in that no flaking or chipping was observed, the ink exhibited excellent crease and smear resistance, and the ink remained on the paper after being soaked in hot water for 30 minutes. It is believed that an ink comprising these ingredients and a dye will exhibit similar characteristics.

EXAMPLE III

A magenta hot melt ink composition was prepared by mixing 20 parts by weight of a formaldehyde-toluenesulfonamide condensation polymer, commercially available as Ketjenflex MS80 from Akzochemie, Netherlands, 10 parts by weight of an epoxy resin, commercially available as Epotuf 37001 from Reichold Chemical Company, 5 parts by weight of decyl sulfone, 64 parts by weight of methyl sulfone, and 1 part by weight of Neozapon Red 492 (BASF) dye. The mixture was heated to slightly beyond its melting temperature, stirred until a homogeneous melt mixture was obtained, and subsequently was cooled to room temperature to yield a homogeneous, uniform magenta solid hot melt ink.

A sample of the magenta hot melt ink was hand coated onto Xerox ® 4024 paper and onto transparency material while it was in its molten state. The ink exhibited good compatibility with the paper and the transparency material in that no flaking or chipping was observed, the ink exhibited excellent crease and smear resistance, and the ink remained on the paper after being soaked in hot water for 30 minutes.

EXAMPLE IV

A yellow hot melt ink composition was prepared by mixing 20 parts by weight of a formaldehyde-toluenesulfonamide condensation polymer, commercially available as Ketjenflex MS80 from Akzochemie, Netherlands, 10 parts by weight of an epoxy resin, commercially available as Epotuf 37001 from Reichold Chemical Company, 5 parts by weight of decyl sulfone, 61 parts by weight of methyl sulfone, and 4 parts by weight of Orasol Yellow 4GN (Ciba-Geigy) dye. The mixture was heated to slightly beyond its melting temperature, stirred until a homogeneous melt mixture was obtained, and subsequently was cooled to room temperature to yield a homogeneous, uniform yellow solid hot melt ink.

A sample of the yellow hot melt ink was hand coated onto Xerox ® 4024 paper and onto polysulfone transparency material while it was in its molten state. The ink exhibited good compatibility with the paper and the transparency material in that no flaking or chipping was observed, the ink exhibited excellent crease and smear resistance, and the ink remained on the paper after being soaked in hot water for 30 minutes.

EXAMPLE V

A cyan hot melt ink composition was prepared by mixing 20 parts by weight of a formaldehyde-toluenesulfonamide condensation polymer, commercially available as Ketjenflex MS80 from Akzochemie, Netherlands, 10 parts by weight of an epoxy resin, commercially available as Epotuf 37001 from Reichold Chemical Company, 5 parts by weight of decyl sulfone, 64 parts by weight of methyl sulfone, and 1 part by weight of Neozapon Blue 807 (BASF) dye. The mixture was heated to slightly beyond its melting temperature, stirred until a homogeneous melt mixture was obtained, and subsequently was cooled to room temperature to yield a homogeneous, uniform cyan solid hot melt ink.

A sample of the cyan hot melt ink was hand coated onto Xerox ® 4024 paper and onto polysulfone transparency material while it was in its molten state. The ink exhibited good compatibility with the paper and the transparency material in that no flaking or chipping was observed, the ink exhibited excellent crease and smear resistance, and the ink remained on the paper after being soaked in hot water for 30 minutes.

EXAMPLE VI

A black hot melt ink composition was prepared by mixing 20 parts by weight of a formaldehyde-toluenesulfonamide condensation polymer, commercially available as Ketjenflex MH from Akzochemie, Netherlands, 80 parts by weight of methyl sulfone, and 1.5 parts by weight of Orasol Black RLP (Ciba-Geigy) dye. The mixture was heated to slightly beyond its melting temperature, stirred until a homogeneous melt mixture was obtained, and subsequently was cooled to room temperature to yield a homogeneous, uniform black solid hot melt ink.

A sample of the black hot melt ink was hand coated onto Xerox ® 4024 paper and onto polysulfone transparency material while it was in its molten state. The ink exhibited good compatibility with the paper and the transparency material in that no flaking or chipping was observed, the ink exhibited excellent crease and smear resistance, and the ink remained on the paper after being soaked in hot water for 30 mintues.

EXAMPLE VII

A transparent hot melt ink composition was prepared by mixing 60 parts by weight of decyl sulfone and 40 parts by weight of imidazole. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 60 percent by weight of decyl sulfone and 40 percent by weight of imidazole. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead at 535 milliamps at 138° C. with a drop frequency of from 600 to 2,000 Hz. The molten composition exhibited a relatively low viscosity of less than 20 centipoise at 130° C., and solidified in two stages upon cooling, first to a viscous liquid and then to a crystalline, smooth, somewhat waxy solid material. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE VIII

A transparent hot melt ink composition was prepared by mixing 30 parts by weight of decyl sulfone, 30 parts by weight of amyl sulfone, and 40 parts by weight of imidazole. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 30 percent by weight of decyl sulfone, 30 percent by weight of amyl sulfone, and 40 percent by weight of imidazole. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead at 535 milliamps at 138° C. with a drop frequency of from 600 to 2,000 Hz. The molten composition exhibited a relatively low viscosity of less than 20 centipoise at 130° C., and solidified in two stages upon cooling, first to a viscous liquid and then to a crystalline, smooth, somewhat waxy solid material. A comparison of this ink with the ink of Example VII indicated that the ink of Example VII, which contained a greater amount of decyl sulfone than the present ink, was more waxy and less crystalline in nature than the present ink. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE IX

A transparent hot melt ink composition was prepared by mixing 20 parts by weight of Paracin 285 (N,N'ethylene-bis-12-hydroxystearamide, CasChem Chemical Corporation), 40 parts by weight of Unilin ® 425 (linear primary alcohol with about 26 carbon atoms, Petrolite Chemical Company), and 40 parts by weight of imidazole. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 20 percent by weight of N,N'ethylene-bis-12-hydroxystearamide, about 40 percent by weight of the linear primary alcohol, and about 40 percent by weight of imidazole. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead with very uniform nucleation at 490 milliamps at 138° C. with 3 microsecond pulses. No gas evolution or free bubbles were observed under microscope. Further, no residual deposits had formed on the heater surface after 3 hours of jetting, and the voltage required to enable stable bubble formation remained constant over this period. The molten composition exhibited a relatively low viscosity of less than 20 centipoise at 130° C., and solidified within 10 seconds of being deposited on the substrate. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE X

A transparent hot melt ink composition was prepared by mixing 10 parts by weight of Paracin 285 (N,N'ethylene-bis-12-hydroxystearamide, CasChem Chemical Corporation), 40 parts by weight of Unilin ® 425 (linear primary alcohol with about 26 carbon atoms, Petrolite Chemical Company), 10 parts by weight of decyl sulfone, and 40 parts by weight of imidazole. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 10 percent by weight of N,N'ethylene-bis-12-hydroxystearamide, about 40 percent by weight of the linear primary alcohol, about 10 percent by weight of decyl sulfone, and about 40 percent by weight of imidazole. This material was jetted onto Xerox ® 4024 paper and onto polysulfone transparency material by incorporating it into a thermal ink jet printing test figure equipped with a Hewlett-Packard ThinkJet ® printhead and generating images. The ink generated bubbles over the entire printhead with very uniform nucleation at 490 milliamps at 138° C. with 3 microsecond pulses. No gas evolution or free bubbles were observed under microscope. Further, no residual deposits had formed on the heater surface after 3 hours of jetting, and the voltage required to enable stable bubble formation remained constant over this period. The molten composition exhibited a relatively low viscosity of less than 20 centipoise at 130° C., and solidified within 10 seconds of being deposited on the substrate. A comparison of this ink with the ink of Example IX indicated that substitution of 10 percent by weight of decyl sulfone for 10 percent by weight of the Paracin 285 imparted plasticizing characteristics to the ink mixture of the present example. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE XI

A black hot melt ink composition was prepared by mixing 10 parts by weight of Paracin 285, 35 parts by weight of Unilin 425, 45 parts by weight of imidazole, and 10 parts by weight of decyl sulfone. To the transparent mixture was added about 10 percent by weight of Orasol Black RLP dye. The mixture was heated to a temperature slightly beyond the temperature at which the mixture melted, stirred until a homogeneous melt mixture was obtained, and subsequently was cooled to room temperature to yield a homogeneous, uniform black solid hot melt ink.

A sample of the black hot melt ink was hand coated onto Xerox ® 4024 paper while it was in its molten state. The ink exhibited good compatibility with the paper in that no flaking or chipping was observed, the ink exhibited excellent crease resistance, and the ink remained on the paper after being soaked in hot water for 30 minutes.

EXAMPLE XII

A transparent hot melt ink composition was prepared by mixing 40 parts by weight of Unilin ® 425 (linear primary alcohol with about 26 carbon atoms, Petrolite Chemical Company), 20 parts by weight of cholesterol, and 40 parts by weight of imidazole. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink comprising about 40 percent by weight of the linear primary alcohol, about 20 percent by weight of cholesterol, and about 40 percent by weight of imidazole. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead with very uniform nucleation at 500 milliamps at 138° C. with 3 microsecond pulses and a drop frequency of 2,000 Hz. The molten composition exhibited a relatively low viscosity of less than 20 centipoise at 130° C., and solidified in two stages upon cooling, first to a viscous liquid and then to a crystalline, smooth, somewhat waxy solid material. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE XIII

A transparent hot melt ink composition was prepared by mixing 50 parts by weight of Unilin ® 425 (linear primary alcohol with about 26 carbon atoms, Petrolite Chemical Company), 20 parts by weight of Aerosol OT100 (a dioctyl sodium sulfosuccinate surfactant, American Cyanamid, Stamford, CT), and 30 parts by weight of water. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink. The presence of the surfactant increased compatibility between the water propellant and the long chain alcohol binder to form a stable dispersion. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead heater at 343 milliamps at 138° C. with 3 microsecond pulses and a drop frequency of 2,000 Hz. The molten composition exhibited a relatively low viscosity of less than 20 centipoise at 130° C. Bubble nucleation was comparable to that observed for water alone, and drop size on the substrate was about 25 microns, indicating that the formulation was suitable for high resolution printing. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE XIV

A transparent hot melt ink composition was prepared by mixing 75 parts by weight of Unilin ® 425 (linear primary alcohol with about 26 carbon atoms, Petrolite Chemical Company), 20 parts by weight of imidazole, and 5 parts by weight of decyl sulfone. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink. This material was jetted onto Xerox ® 4024 paper and onto polysulfone transparency material by incorporating it into a thermal ink jet printing test fixture equipped with a Hewlett-Packard ThinkJet ® printhead and generating images. The ink generated bubbles over the entire printhead heater at 500 milliamps at 122° C. with 4.8 microsecond pulses and a drop frequency of 500 Hz. The molten composition exhibited a relatively low viscosity of less than 20 centipoise at 130° C., and drop size on the substrate was about 80 microns. The transparent images thus generated exhibited good adherence to the paper and to the transparency material, resistance to creasing and smearing, and waterfastness after being soaked in hot water for 10 minutes. It is believed that an ink comprising these ingredients and a dye will exhibit similar characteristics.

EXAMPLE XV

A transparent hot melt ink composition was prepared by mixing 30 parts by weight of Unilin ® 425 (linear primary alcohol with about 26 carbon atoms, Petrolite Chemical Company), 30 parts by weight of Unithox ® 520 (ethoxylated linear primary alcohol wherein the alcohol has a molecular weight of about 520 and 3 ethoxy groups are present, Petrolite Chemical Company), 10 parts by weight of palmitic acid, and 30 parts by weight of dimethylurea. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink. The bubble nucleation characteristics of this material were tested by incorporating it into a thermal ink jet printing test fixture and observing bubble nucleation under a microscope. The ink generated bubbles over the entire heater at 525 milliamps at 138° C. with a drop frequency of 2,000 Hz. It is believed that an ink comprising these ingredients and a dye will exhibit similar characteristics.

EXAMPLE XVI

A transparent hot melt ink composition was prepared by mixing 40 parts by weight of Unithox ® 720 (ethoxylated linear primary alcohol wherein the alcohol has a molecular weight of about 720 and 4 ethoxy groups are present, Petrolite Chemical Company), 30 parts by weight of Unithox ® 550 (ethoxylated linear primary alcohol wherein the alcohol has a molecular weight of about 550 and 13 ethoxy groups are present, Petrolite Chemical Company), 10 parts by weight of palmitic acid, and 30 parts by weight of dimethyl sulfone. The mixture was heated to a temperature slightly beyond the temperature at which the mixture melted, stirred until a homogeneous melt mixture was obtained, and subsequently was cooled to room temperature to yield a homogeneous, uniform transparent solid hot melt ink. The bubble nucleation characteristics of this material were tested by incorporating it into a thermal ink jet printing test fixture and observing bubble nucleation under a microscope. The ink generated bubbles over the entire heater at 472 milliamps at 138° C. with a drop frequency of 2,000 Hz. After two hours, only minimal deposits of ink residue had formed on the heater surface. It is believed that an ink comprising these ingredients and a dye will exhibit similar characteristics.

EXAMPLE XVII

Various propellant materials listed in the table below were incorporated into a laboratory test fixture equipped with a printhead. The materials were heated to the indicated temperature under the indicated conditions and bubble nucleation was observed under a microscope. In each instance, the drop frequency was 600 Hz. It is believed that hot melt ink compositions containing these materials as propellants will exhibit good bubble nucleation under operating conditions in a thermal ink jet printer equipped for printing with hot melt inks.

| Propellant | Temp. (°C.) | Start Current (mA) | Observations |
| --- | --- | --- | --- |
| propionamide | 138 | 437 | Bubble formation over entire heater; some gas formation at currents over 700 mA. |
| 2-ethyl imidazole | 138 | 472 | Bubble formation over entire heater; little gas formation; stable bubble formation; good nucleation. |
| 2-imidazoline | 148 | 542 | Large bubble formation; some nonuniformities in nucleation. |
| 1,2,4-triazole | 138 | 504 | Bubble formation over entire heater; bubbles large and somewhat irregular. |
| 3,5-dimethyl-pyrazole | 138 | 440 | Bubble formation over entire heater; bubbles large. |
| 3-hydroxy benzyl alcohol | 138 | 490 | Bubble formation over entire heater; bubbles large; some gas formation. |
| 1,3-dimethyl-urea | 138 | 483 | Bubble formation over entire heater; bubbles large and agitated. |
| methane sulfonamide | 114 | 511 | Bubble formation over entire heater. |
| pyrazole | 114 | 378 | Bubble formation over entire heater. |
| pyrazine | 114 | 329 | Bubble formation over entire heater; very large bubbles at high power levels. |
| succinimide | 148 | 497 | Bubble formation over entire heater at high power levels. |
| propylene carbonate | 138 | 400 | Large bubble formation. |
| imidazole | 138 | 434 | Very large bubbles very similar to water in conformation. |
| lactamide | 138 | 459 | Large bubbles formed with some extraneous gas evolution. |
| methyl sulfone | 138 | 440 | Easy bubble formation with bubbles forming over greater than 50 percent of the heater area at higher power levels. |

EXAMPLE XVIII

A red ink formulation was prepared by heating 100 parts by weight of n-dodecyl-1-thio-β-D-glucoside to a temperature slightly above its melting point and adding 0.5 parts by weight of Sudan Red dye (BASF). The mixture was stirred until a homogeneous melt mixture was obtained. A sample of the resulting formulation was hand coated onto plain paper and exhibited good adhesion, low brittleness, good optical density, and transparency to unpolarized light. It is believed that when this formulation is mixed with a propellant such as water or methyl sulfone, the resulting ink will be suitable for generating images in a thermal ink jet printer equipped for printing with hot melt inks.

EXAMPLE XIX

A blue ink formulation was prepared by heating 100 parts by weight of n-dodecyl-1-thio-$\beta$-D-glucoside to a temperature slightly above its melting point and adding 0.5 parts by weight of Sudan Blue dye (BASF). The mixture was stirred until a homogeneous melt mixture was obtained. A sample of the resulting formulation was hand coated onto plain paper and exhibited good adhesion, low brittleness, good optical density, and transparency to unpolarized light. It is believed that when this formulation is mixed with a propellant such as water or methyl sulfone, the resulting ink will be suitable for generating images in a thermal ink jet printer equipped for printing with hot melt inks.

EXAMPLE XX

A yellow ink formulation was prepared by heating 100 parts by weight of n-dodecyl-1-thio-$\beta$-D-glucoside to a temperature slightly above its melting point and adding 0.5 parts by weight of Sudan Yellow dye (BASF). The mixture was stirred until a homogeneous melt mixture was obtained. A sample of the resulting formulation was hand coated onto plain paper and exhibited good adhesion, low brittleness, good optical density, and transparency to unpolarized light. It is believed that when this formulation is mixed with a propellant such as water or methyl sulfone, the resulting ink will be suitable for generating images in a thermal ink jet printer equipped for printing with hot melt inks.

EXAMPLE XXI

A black ink formulation was prepared by heating 100 parts by weight of n-dodecyl-1-thio-$\beta$-D-glucoside to a temperature slightly above its melting point and adding 0.5 parts by weight of Typophor Black dye (BASF). The mixture was stirred until a homogeneous melt mixture was obtained. A sample of the resulting formulation was hand coated onto plain paper and exhibited good adhesion, low brittleness, good optical density, and transparency to unpolarized light. It is believed that when this formulation is mixed with a propellant such as water or methyl sulfone, the resulting ink will be suitable for generating images in a thermal ink jet printer equipped for printing with hot melt inks.

Other embodiments and modifications of the present invention may occur to those skilled in the art subsequent to a review of the information presented herein; these embodiments and modifications, as well as equivalents thereof, are also included within the scope of this invention.

What is claimed is:

1. A hot melt ink composition which comprises an effective amount of a colorant to color the ink an effective amount of a propellant to propel the ink and a binder comprising a liquid crystalline material present in an amount of at least 30 percent by weight of the ink.

2. A hot melt ink composition according to claim 1 wherein the propellant is selected from the group consisting of water; hydrazine; alcohols; cylic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide.

3. A hot melt ink composition according to claim 1 wherein the binder is selected from the group consisting of (1) alkyl thio-$\beta$-D-glucosides, of the general formula:

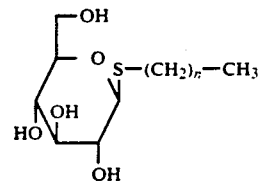

wherein n is a number between about 7 and about 100; (2) n-alkyl-$\beta$-D-glycosides of the general formula:

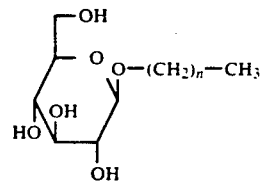

wherein n is a number between about 7 and about 100; (3) n-alkyl 1-O-glycosides with deoxygenated sugar components, wherein the n-alkyl portion contains from about 7 to about 100 carbon atoms; (4) n-alkyl 1-O-glycosides with esterified sugar components, wherein the n-alkyl portion contains from about 7 to about 100 carbon atoms; (5) n-alkyl 1-O-glycosides with alkylated hydroxyl groups, wherein the n-alkyl portion contains from about 7 to about 100 carbon atoms; (6) n-alkyl 1-O-glycosides with oxidized hydroxyl groups, wherein the n-alkyl portion contains from about 7 to about 100 carbon atoms; (7) n-alkyl 1-S-glycosides with deoxygenated sugar components, wherein the n-alkyl portion contains from about 7 to about 100 carbon atoms; (8) n-alkyl 1-S-glycosides with esterified sugar components, wherein the n-alkyl portion contains from about 7 to about 100 carbon atoms; (9) n-alkyl 1-S-glycosides with alkylated hydroxyl groups, wherein the n-alkyl portion contains from about 7 to about 100 carbon atoms; (10) n-alkyl 1-S-glycosides with oxidized hydroxyl groups, wherein the n-alkyl portion contains from about 7 to about 100 carbon atoms; (11) 1-O-alkyl derivatives of anhydroalditols, wherein the alkyl portion contains from about 7 to about 100 carbon atoms; (12) n-alkylamide derivatives of aldonic acids, wherein the n-alkyl portion contains from about 7 to about 100 carbon atoms; (13) 1-N-alkyl derivatives of sugar alditols, wherein the alkyl portion contains from about 7 to about 100 carbon atoms; (14) n-alkyl-$\beta$-D-glucopyranosides, wherein the n-alkyl portion contains from about 7 to about 100 carbon atoms; and (15) n-alkyl-$\beta$-D-maltosides, wherein the n-alkyl portion contains from about 7 to about 100 carbon atoms.

4. A hot melt ink composition according to claim 1 wherein the binder is selected from the group consisting of n-dodecyl-1-thio-$\beta$-D-glucopyranoside, n-dodecyl-1-thio-$\beta$-D-galactopyranoside, and n-dodecyl-1-thio-$\beta$-D-xylopyranoside.

5. A hot melt ink composition according to claim 1 wherein the colorant is a dye.

6. A hot melt ink composition according to claim 1 wherein the colorant is present in an amount of from about 0.5 to about 10 percent by weight, the binder is present in an amount of up to about 85 percent by weight, and the propellant is present in an amount of from about 30 to about 50 percent by weight.

7. A hot melt ink composition according to claim 1 wherein the colorant is present in an amount of from about 0.5 to about 10 percent by weight, the binder is present in an amount of from about 30 to about 70 percent by weight, and the propellant is present in an amount of from about 30 to about 50 percent by weight.

8. A process for generating images in which the improvement comprises incorporating into an ink jet printing apparatus the ink composition of claim 3 and forming images by melting the ink and causing the melted ink to be expelled in droplets onto a substrate, thereby generating an image on the substrate.

9. A process for generating images in which the improvement comprises incorporating into an ink jet printing apparatus an ink composition comprising an effective amount of a colorant to color the ink, an effective amount of a propellant to propel the ink and a binder comprising a liquid crystalline material present in an amount of at least 30 percent by weight of the ink, and forming images by melting the ink and causing the melted ink to be expelled in droplets onto a substrate, thereby generating an image on the substrate.

10. A process for generating images according to claim 9 wherein the propellant is selected from the group consisting of water; hydrazine; alcohols; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide.

11. A process for generating images according to claim 9 wherein the binder is selected from the group consisting of n-dodecyl-1-thio-$\beta$-D-glucopyranoside, n-dodecyl-1-thio-$\beta$-D-galactopyranoside, and n-dodecyl-1-thio-$\beta$-D-xylopyranoside.

12. A process for generating images according to claim 3 wherein the colorant is a dye.

13. A process for generating images according to claim 9 wherein the colorant is present in an amount of from about 0.5 to about 10 percent by weight, the binder is present in an amount of up to about 85 percent by weight, and the propellant is present in an amount of from about 30 to about 50 percent by weight.

14. A process for generating images according to claim 9 wherein the colorant is present in an amount of from about 0.5 to about 10 percent by weight, the binder is present in an amount of from about 30 to about 70 percent by weight, and the propellant is present in an amount of from about 30 to about 50 percent by weight.

* * * * *